Aug. 19, 1969     D. BIERMANN     3,461,966
UNITARY FIXED PITCH AIRCRAFT PROPELLER
Filed Oct. 16, 1967
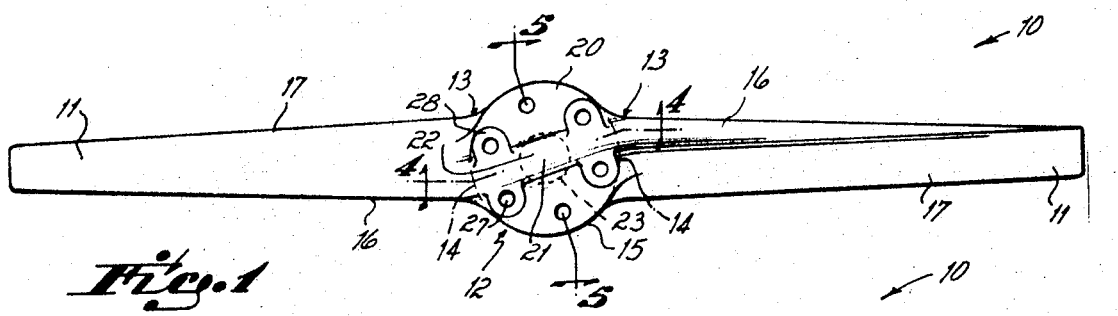
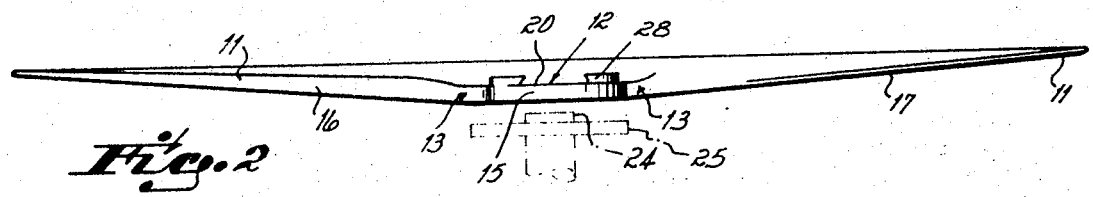
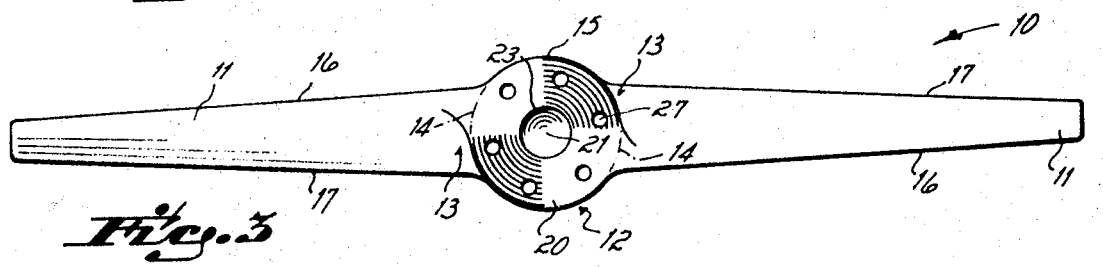
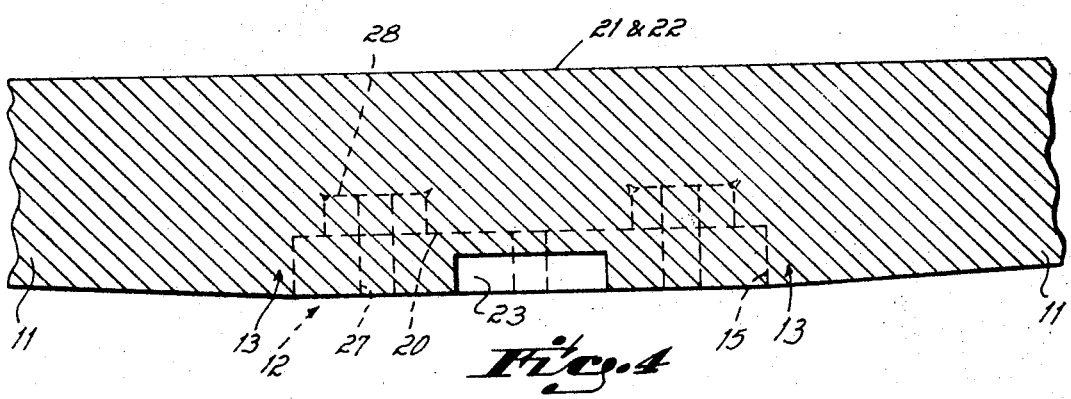
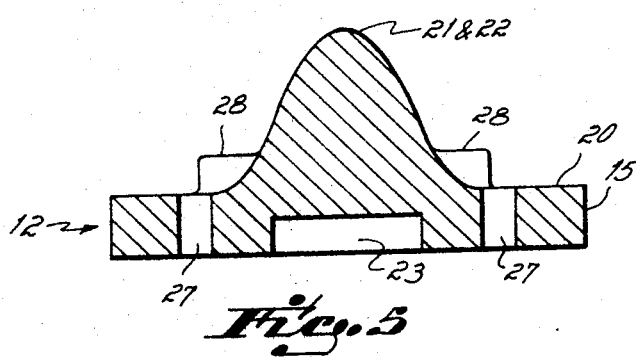
INVENTOR
David Biermann
BY
Wood, Herron and Evans
ATTORNEYS

United States Patent Office 3,461,966
Patented Aug. 19, 1969

3,461,966
UNITARY FIXED PITCH AIRCRAFT PROPELLER
David Biermann, Piqua, Ohio, assignor to Hartzell Propeller, Inc., Piqua, Ohio, a corporation of Ohio
Filed Oct. 16, 1967, Ser. No. 675,496
Int. Cl. B64c *11/10, 11/22*
U.S. Cl. 170—159                            13 Claims

ABSTRACT OF THE DISCLOSURE

A one piece metallic aircraft propeller having at least two blades integral with a hub, the central portion of said hub being imperforate.

---

This invention relates to an aircraft propeller and more particularly to improvements in a fixed pitch propeller. Fixed pitch aircraft propellers were first made of wood in the early stages of the development of aircraft. The broad method of design and manufacture was established fairly early and was never changed. Laminations of wood which extended from one tip to the other were glued together and the hub and blade portions carved out to suit the particular application. The hub portion was made thick and heavy in order that a steel hub insert could be bolted to it for driving the propeller. The steel hub insert was in turn bolted to the engine shaft, which extended through the center of the hub.

At a later period of development the wooden propeller gave way to the all aluminum alloy propeller. The broad design was not greatly altered only the material was changed. The hub portion was similar to the old wooden propellers. Even the steel hub insert was adhered to at first, since the engine shaft extended through the propeller from rear to front.

At a later date the engine shaft was changed to a flange type which eliminated the requirement for a steel hub insert. The aluminum propeller was bolted directly to the flange, which was a part of the engine crankshaft. The aluminum propeller retained the same basic design, relative to the central hub portions, as for the earlier wooden propellers. Even the central hole, which is used to receive the engine shaft, has been retained. Thus, the present day metal propeller design has not been altered to take advantage of the change in engine shaft mounting provisions to the fullest degree possible. The central hub portions are thick and heavy, which results in added cost of materials and more weight; both of which are very important considerations.

This heavy construction results from the very inefficient utilization of the material. The centrifugal force of each blade must be transmitted through the hub portion. The presence of the central hole forces the path of this stress to travel around this hole, which is not a straight line path. The bolt holes are located in the path of this stress and therefore each hole is a local stress raiser, which requires extra material to make it sufficiently free from failure due to vibrational and steady centrifugal stresses.

It has been an objective of the invention to provide an improvement in fixed-pitch propellers which eliminates the need for the excess metal heretofore required in the hub portion of the propeller. This objective of the invention is attained first by eliminating the central hole through the propeller thereby permitting the line of stress developed by the centrifugal force on the propeller blades to pass directly through the center of the propeller. More particularly the central portion of the hub constitutes a continuation in cross section of the root ends of the blades. Second, the bolt holes by which the propeller is attached to the flange on the engine shaft are disposed to the sides of the central stress line between the propeller blades.

The several features and objectives of the invention will become more readily apparent from the following detailed description taken in conjunction with the accompanying drawings in which:

FIG. 1 is a front elevational view of a propeller constructed in accordance with the present invention,
FIG. 2 is a side elevational view thereof,
FIG. 3 is a rear elevational view thereof,
FIG. 4 is a cross sectional view taken along lines 4—4 of FIG. 1, and
FIG. 5 is a cross sectional view taken along lines 5—5 of FIG. 1.

A propeller blade of the present invention is indicated at 10 in FIG. 1 and includes two blades 11 and a hub 12. While two blades are shown, it should be understood that the invention is applicable to propellers having three or four blades. The propeller is formed from a single piece of metal preferably aluminum, with the hub 12 being forged to final shape in a die. As will appear, the hub of the blade is sufficiently strong to withstand the centrifugal force applied to it by the rotating blades during its operation even without an additional steel insert and without requiring a substantial amount of excess metal to compensate for localized stress concentration.

Each blade is connected to the hub 12 at its root end indicated at 13. For the purpose of this description, let it be assumed that the root end of the blade is delineated by a line 14, constituting a continuation of the circumference 15 of the hub 12. The leading edge of the blade is thick as indicated at 16, the trailing edge 17 being thinner than the leading edge so as to form an air foil as is common in propeller construction.

The hub 12 is formed by a thin flange 20 and a thick imperforate central portion 21. The central portion 21 is formed by a rib 22 extending diametrally across the hub, the rib being a continuation of the thick root end of the propeller blades. Thus, the central imperforate hub portion of the blade constitutes a continuous uninterrupted flow of structural material from one blade to the opposite blade, and having substantially the same cross section as the root ends of the blades.

The opposite surface of the central portion of the hub 12 has a shallow recess 23 which is adapted to receive the stub end 24 of an engine shaft to effect the precise centering of the blade on the shaft. As shown in FIG. 2, the engine shaft has a flange 25 to which the propeller flange 20 is bolted to secure the propeller to the shaft. The flange 20 has holes 27 by which the propeller flange is bolted to the flange 25 on the engine shaft. It should be noted that the holes 27 are disposed at the side of the rib 22 of the hub. Since the rib 22 constitutes a continuation of the thick leading edge of each blade, it forms a major stress carrying section. By disposing the bolt holes 27 on either side of the central portion 21, the principal stress lines created by the centrifugal force on the blades flow directly from one blade root end to the other and are uninterrupted by bolt holes or by a central hole in the hub and hence, minimize any possibility of local stress areas. The substantial elimination of localized stress areas reduces markedly the requirement for a beefed up central hub for the propeller blade. The bolt holes immediately adjacent the central portion 21 of the hub may be provided with bosses 28 to compensate for any reduction of strength caused by the removal of material at those holes.

I claim:
1. In an airplane, a propeller assembly comprising:
a drive shaft;
a flange mounted on the end of the drive shaft;
a fixed pitch propeller having a central hub portion,
at least two blades radiating integrally from the central hub portion to form a one piece propeller, each said blade having airfoil sections increasing in thickness from the tip end to the root end of each said blade and varying in thickness from leading edge to trailing edge;

the hub portion providing a continuous uninterrupted flow of structural material of essentially the same cross sectional area as the root end of the blade, said material joining, at the center of the hub portion, the thick portion of the root end of each blade so as to provide an uninterrupted major stress path through the center of the hub portion;

a second flange formed integral with the hub portion of the propeller for mating with the flange of the drive shaft; and at least one of the flanges having holes to receive fastening elements for securing the propeller flange to the flange of the drive shaft.

2. In an airplane, a propeller assembly comprising:
a drive shaft;
a flange mounted on the end of the drive shaft;
a propeller consisting of at least two blades and formed as a single uninterrupted member extending from tip to tip, the sections of which are airfoil sections proportioned gradually and continuously from tip to tip, the leading edges of said blades defining the thicker portions thereof and the major stress lines thereof, said leading edges joining at the center of said propeller;
a flange formed integral with the propeller at its center for attaching the propeller to the drive shaft flange, said propeller flange having a plurality of holes disposed to the sides of the major stress lines of the propeller for receiving bolts; and
a plurality of bolts passing through the holes in the propeller flange for securing the propeller to the drive shaft flange.

3. A propeller assembly according to claim 1 in which the drive shaft has a short extension protruding beyond the outer face of the drive shaft flange, and the propeller hub has a shallow recess mating with the extension of the drive shaft.

4. A propeller assembly according to claim 1 further comprising raised bosses integral with the propeller flange and surrounding at least those holes closest to the propeller blades.

5. A propeller comprising:
a hub having an imperforate central portion and a flange for attaching the propeller to a drive shaft;
at least two blades radiating from the hub and formed integrally therewith of a single piece of metal, increasing in thickness from the tip end to the root end of each said blade and varying in thickness from leading edge to trailing edge, said blades having airfoil sections,
said blades being joined together at their root ends by structural material extending the corresponding edges of the blades through the center of the hub, said structural material being uninterrupted along the major stress lines of the blades.

6. A propeller according to claim 5 in which the central portion of the hub has a recess extending only partially therethrough to receive and center the end of a drive shaft.

7. A propeller according to claim 5 in which the flange has a plurality of bolt holes adapted to receive bolts for attaching the propeller to a drive shaft.

8. A propeller according to claim 7 in which said bolt holes are symmetrically located on each side of the major stress axis of each blade extended through the hub.

9. A propeller according to claim 5 in which the cross sectional area through the center of the hub is at least as great as the cross sectional area of the root ends of the blades.

10. A propeller according to claim 5 in which the thickness of the hub at its center is at least as great as the maximum thickness of the blades.

11. A fixed pitch propeller comprising:
two blades, each having airfoil sections increasing in thickness from the tip end to the root end thereof, each said blade having a thick leading edge and a thin trailing edge;
a hub portion joining the two blades at their root ends forming a one piece propeller, said hub portion having a substantially uninterrupted center portion extending between the root ends of the blades, said center portion bounded by elements connecting points on the boundaries of the two root sections, said points corresponding leading edge to leading edge, and trailing edge to trailing edge of the blades;
a mounting flange formed integral with the hub portion for attaching the propeller to a drive shaft.

12. A propeller according to claim 11 in which the cross sectional area through the center of the hub is at least as great as the cross sectional area of the root ends of the blades.

13. A propeller according to claim 11 in which the central portion of the hub has a recess extending only partially therethrough to receive and center the end of a drive shaft, and in which the flange has a plurality of bolt holes adapted to receive bolts for attaching the propeller to a drive shaft, said holes being located to the side of the major stress line passing through the hub.

References Cited

UNITED STATES PATENTS

| 1,900,630 | 3/1933 | Zagorski et al. | 170—159 X |
| 2,030,967 | 2/1936 | Crosman | 170—159 |
| 2,161,932 | 6/1939 | Peterson | 170—159 |

FOREIGN PATENTS 566,904  11/1923  France.

EVERETTE A. POWELL, Jr., Primary Examiner

U.S. Cl. X.R.

170—173